(12) United States Patent
Hecht et al.

(10) Patent No.: US 7,407,350 B2
(45) Date of Patent: Aug. 5, 2008

(54) CUTTING TOOL ASSEMBLY AND CUTTING HEAD THEREFOR

(75) Inventors: Gil Hecht, Nahariya (IL); Daniel Men, Haifa (IL)

(73) Assignee: ISCAR Ltd., Tefen (IL)

( * ) Notice: Subject to any disclaimer, the term of this patent is extended or adjusted under 35 U.S.C. 154(b) by 471 days.

(21) Appl. No.: 11/240,409

(22) Filed: Oct. 3, 2005

(65) Prior Publication Data

US 2006/0093449 A1 May 4, 2006

(30) Foreign Application Priority Data

Oct. 28, 2004 (IL) ...................................... 164888

(51) Int. Cl.
*B23B 51/02* (2006.01)
*B23B 51/06* (2006.01)

(52) U.S. Cl. .......................... 408/231; 408/56; 408/713; 407/34

(58) Field of Classification Search ................. 408/227, 408/231, 713; 407/33, 34
See application file for complete search history.

(56) References Cited

U.S. PATENT DOCUMENTS

| | | | |
|---|---|---|---|
| 3,548,688 A | 12/1970 | Kuch | |
| 4,744,704 A | 5/1988 | Galvefors | |
| 5,423,640 A * | 6/1995 | Lindblom et al. | 408/230 |
| 5,904,455 A * | 5/1999 | Krenzer et al. | 408/144 |
| 5,957,631 A | 9/1999 | Hecht et al. | |
| 5,971,673 A * | 10/1999 | Berglund et al. | 408/1 R |
| 5,988,953 A * | 11/1999 | Berglund et al. | 408/1 R |
| 6,012,881 A * | 1/2000 | Scheer | 408/227 |
| 6,059,492 A * | 5/2000 | Hecht | 408/144 |
| 6,109,841 A | 8/2000 | Johne | |
| 6,276,879 B1 | 8/2001 | Hecht | |
| 6,481,938 B2 * | 11/2002 | Widin | 408/226 |
| 6,485,235 B1 * | 11/2002 | Mast et al. | 408/1 R |
| 6,506,003 B1 * | 1/2003 | Erickson | 408/226 |
| 6,530,728 B2 | 3/2003 | Eriksson | |
| 6,551,035 B1 * | 4/2003 | Bruhn et al. | 408/144 |
| 6,551,036 B2 | 4/2003 | Heule | |
| 6,582,164 B1 | 6/2003 | McCormick | |

(Continued)

FOREIGN PATENT DOCUMENTS

GB 1395855 5/1975

(Continued)

OTHER PUBLICATIONS

Search Report, International Application No. PCT/IL2005/000999 dated Jan. 19, 2006.

(Continued)

*Primary Examiner*—David P. Bryant
*Assistant Examiner*—Eric A Gates
(74) *Attorney, Agent, or Firm*—Womble Carlyle

(57) ABSTRACT

A rotary cutting tool comprising a solid cutting head mounted to a shank. The cutting head comprises a cutting portion adjacent a cutting head front face and a mounting portion integrally formed therewith and extending rearwardly therefrom. The shank comprises a receiving portion extending rearwardly from a shank front face. When the cutting head is secured to the shank, the mounting portion is received in the receiving portion, and the shank front face is forwardly exposed and adjacent the cutting head front face.

26 Claims, 6 Drawing Sheets

U.S. PATENT DOCUMENTS

| | | | |
|---|---|---|---|
| 6,695,551 | B2 | 2/2004 | Silver |
| 6,716,388 | B2 | 4/2004 | Bruhn et al. |
| 6,840,717 | B2 * | 1/2005 | Eriksson ..................... 408/1 R |
| 6,899,495 | B2 * | 5/2005 | Hansson et al. ............. 408/144 |
| 7,048,480 | B2 | 5/2006 | Borschert et al. |
| 7,070,367 | B2 * | 7/2006 | Krenzer ..................... 408/226 |
| 7,101,125 | B2 | 9/2006 | Borschert et al. |
| 7,309,196 | B2 * | 12/2007 | Ruy Frota de Souza ..... 408/227 |
| 7,311,480 | B2 * | 12/2007 | Heule et al. ................. 408/233 |
| 2001/0031182 | A1 * | 10/2001 | Widin ........................ 408/230 |
| 2002/0159851 | A1 * | 10/2002 | Krenzer ..................... 408/230 |
| 2002/0168239 | A1 * | 11/2002 | Mast et al. ................. 408/144 |
| 2003/0002932 | A1 | 1/2003 | Eriksson |
| 2003/0039523 | A1 | 2/2003 | Kemmer |
| 2003/0219321 | A1 * | 11/2003 | Borschert et al. ........... 408/230 |
| 2005/0260046 | A1 * | 11/2005 | Hecht et al. .................. 408/31 |
| 2006/0051172 | A1 | 3/2006 | Johnson et al. |

FOREIGN PATENT DOCUMENTS

| | | |
|---|---|---|
| JP | 2002113606 A | 4/2002 |
| JP | 2003291012 A | 10/2003 |
| JP | 2003291013 A | 10/2003 |
| JP | 2003291019 A | 10/2003 |

OTHER PUBLICATIONS

Search Report, PCT/IL2005/000483 dated Sep. 20, 2005.

* cited by examiner

CUTTING TOOL ASSEMBLY AND CUTTING HEAD THEREFOR

FIELD OF THE INVENTION

The present invention relates to a cutting tool assembly comprising a replaceable cutting head and a shank on which the cutting head is mounted, for use in rotary cutting operations such as drilling, milling and the like.

BACKGROUND OF THE INVENTION

U.S. Pat. No. 5,957,631 discloses a rotary cutting tool comprising a cutting head releasably coupled to a shank, the cutting head and the shank being bounded by cutting head and shank peripheral surfaces mating in shape and dimensions, and having cutting edges at a front end of the cutting head. The cutting head and the shank are advantageously coupled by a dovetail coupling arrangement, providing secure retention and stable coupling, without relying on other coupling means, such as screws. This greatly simplifies assembly and disassembly of cutting heads to/from the shank. However, when assembled, the cutting head coupling portions fully overlie the shank coupling portions, which may hinder coolant delivery to the cutting edges, and may require formation of coolant passages through the cutting head.

To facilitate desirable cooling and lubrication of the cutting tool's cutting edges, cutting heads having a spade-like shape may be employed, such as disclosed in U.S. Pat. No. 4,744,704, U.S. Pat. No. 6,530,728, or U.S. Pat. No. 6,551,036. Spade-like cutting heads are generally thin, allowing portions of the shank to extend forwardly to a region adjacent the cutting edges, and facilitate cooling fluid delivery thereto. However, because of their reduced thickness, some additional means of clamping, such as screws, may be required, and even then, tangential forces acting on the cutting edges may disadvantageously deform the shank.

SUMMARY OF THE INVENTION

In accordance with one aspect of the present invention, there is provided a rotary cutting tool comprising a cutting head detachably secured to a shank, the cutting head and the shank having mating cylindrical outer surfaces and leading and trailing flute sections, and a common axis of rotation A defining a front-to-rear direction and a direction of rotation R. The cutting head comprises a cutting portion adjacent a cutting head front face and a mounting portion extending rearwardly therefrom, and the shank comprises a receiving portion extending rearwardly from a shank front face. The mounting portion and the receiving portion mate in shape and dimensions and each comprises at least two coupling portions bounded by the cylindrical outer surfaces and by adjacent leading and trailing flute sections, and comprises a planar base surface extending transversely to the axis of rotation A, a torque transmission wall extending generally inwardly from the cylindrical outer surface to a cylindrical inner wall, and a fixation wall extending rearwardly from the base surface and circumferentially relative to the axis of rotation A, each base surface comprises a first base portion extending generally inwardly from the cylindrical outer surface towards the fixation wall, and from the torque transmission wall to the adjacent leading flute section, and a second base portion co-planar therewith, extending inwardly from the cylindrical inner wall to the fixation wall, and circumferentially from the adjacent trailing flute section towards the first base portion. The clamping portions of the mounting and receiving portions engage each other, with their fixation walls, their torque transmission walls, their first base portions and their second base portions abutting each other.

Preferably, a relief channel disposed in each shank base surface, separates the shank first and second base portions, and extends from the shank first base portion to the shank fixation wall, and circumferentially from the adjacent shank flute leading section to the shank second base portion.

Further preferably, a maximal radial extension of the first base portion R1 is greater than a maximal radial extension of the second base portion R2, and the maximal radial extension of the second base portion R2 is greater than or equal to a maximal radial extension of the fixation wall RF.

Yet further preferably, the maximal radial extension of the shank second base portion R2S is greater than the maximal radial extension of the cutting head second base portion R2H.

Typically, a first gap exists between opposing cutting head and shank cylindrical inner walls.

Preferably, the shank front face is forwardly exposed and adjacent the cutting head front face.

Further preferably, the cutting head and shank torque transmission walls and the cutting head and shank cylindrical inner walls extend forwardly from the cutting head and shank base surfaces to the cutting head and shank front faces, respectively.

If desired, the torque transmission walls extend away from the base surface in a direction diverging from the axis of rotation A, at an acute tilt angle.

Preferably, the acute tilt angle is equal to, or less than, 20°.

Generally, in a cross section perpendicular to the axis of rotation A adjacent the base surface, the torque transmission wall of each coupling portion forms a radial deviation angle with a radius-vector extending from the axis of rotation A to an external edge at the intersection of the torque transmission wall and the cylindrical outer surface.

Preferably, the radial deviation angle is equal to, or less than 5°.

Typically, the fixation walls extend coaxially with, and diverge radially from, the axis of rotation A, in a direction away from the base surfaces.

Preferably, the fixation walls extend rearwardly from the base surfaces to merge with a curved rear surface.

Further preferably, the curved rear surfaces extend rearwardly while curving radially inwardly to merge with a rear face generally perpendicular to the axis of rotation A.

Yet further preferably, when the cutting head is secured in the shank, a second gap exists between the curved rear surfaces and the rear faces of the mounting and receiving portions.

In accordance with another aspect of the present invention, there is provided a replaceable cutting head for mounting to a shank of a rotary cutting tool having an axis of rotation A defining a front-to-rear direction and a direction of rotation R and comprising a cutting head cutting portion adjacent a cutting head front face and a mounting portion extending rearwardly therefrom. The mounting portion comprises at least two cutting head coupling portions, each cutting head coupling portion comprises a planar cutting head base surface extending transversely to the axis of rotation A, a cutting head torque transmission wall extending generally radially inwardly from a cutting head cylindrical outer surface to a cutting head cylindrical inner wall and forwardly from the cutting head base surface, and a cutting head fixation wall extending rearwardly from and circumferentially along the cutting head base surface relative to the axis of rotation A. Each cutting head base surface comprises a cutting head first base portion extending generally inwardly from the cutting head cylindrical outer surface to the cutting head fixation wall, and from the cutting head torque transmission wall to a cutting head leading flute portion, and a cutting head second base portion co-planar with the cutting head first base portion, extending continuously circumferentially from a cutting head trailing flute section to the cutting head first base portion and inwardly from the cutting head cylindrical inner wall to the cutting head fixation wall.

In accordance with another aspect, the invention is directed to a rotary cutting tool assembly comprising a cutting head and a shank that are adjustable from an initial position in which the two are separated, to a secured position in which the cutting head coupling portions and the shank coupling portions engage each other with their fixation walls, their torque transmission walls, their first base portions and their second base portions abutting each other.

BRIEF DESCRIPTION OF THE DRAWINGS

For a better understanding of the present invention and to show how the same may be carried out in practice, reference will now be made to the accompanying drawings, in which.

DETAILED DESCRIPTION OF PREFERRED EMBODIMENTS

Figure 1:
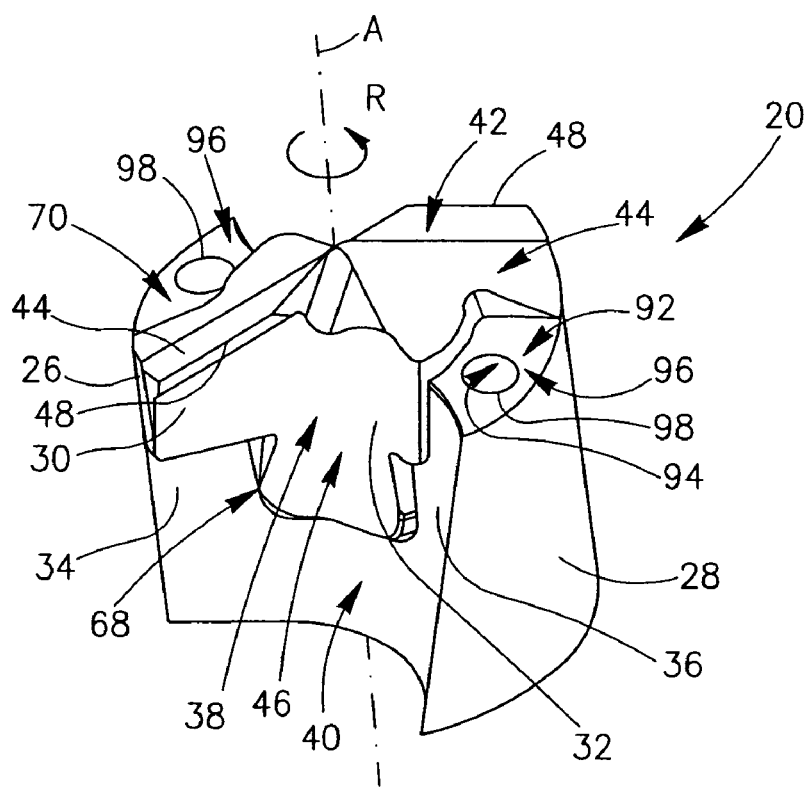
FIG. 1 is a partial perspective view of a drill in accordance with a first embodiment of the present invention.

The present invention relates to a rotary cutting tool assembly, and will be exemplified by means of a drill. Attention is first drawn to FIGS. 1 and 2. A drill 20 in accordance with a first embodiment of the present invention comprises a replaceable cutting head 22 and a shank 24 having a common axis of rotation A defining a front-to rear direction and a direction of rotation R. The cutting head 22 and the shank 24 have mating and continuous cutting head and shank outer cylindrical surfaces 26, 28, and mating cutting head and shank leading and trailing flute sections 30, 32, 34, 36 which, when the drill 20 is assembled, form two continuous, preferably helical, cutting head and shank flutes 38, 40. The drill 20 thus has a 180° rotational symmetry around the axis of rotation A.

Figure 3:
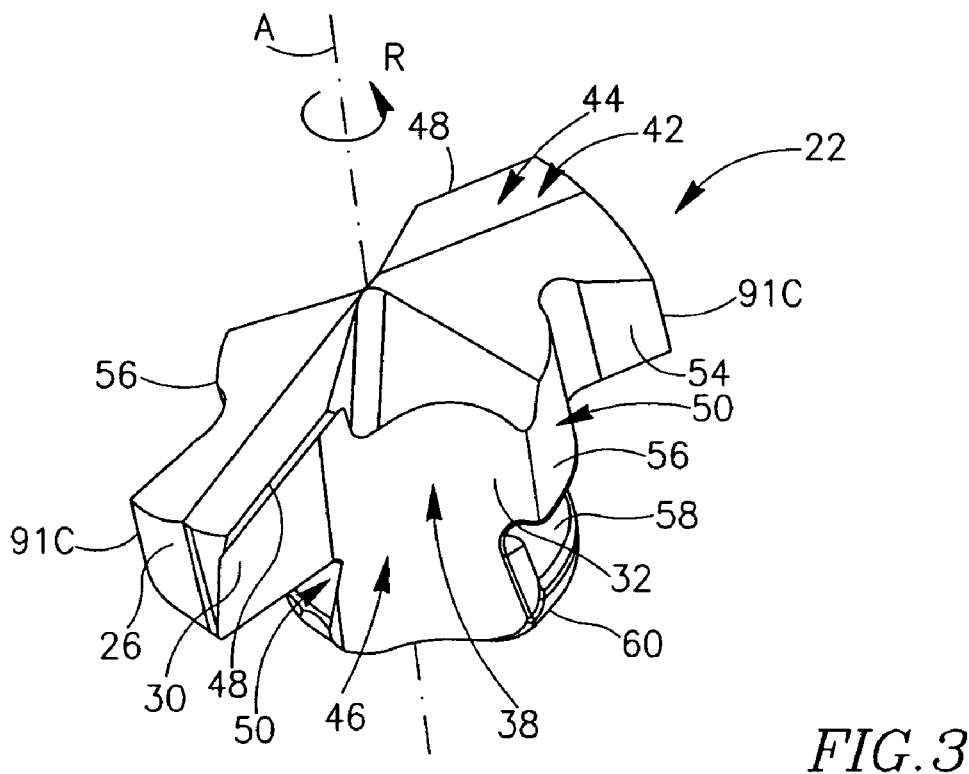
FIG. 3 is a perspective view of a cutting head of the drill shown in FIG. 1.
Figure 4:
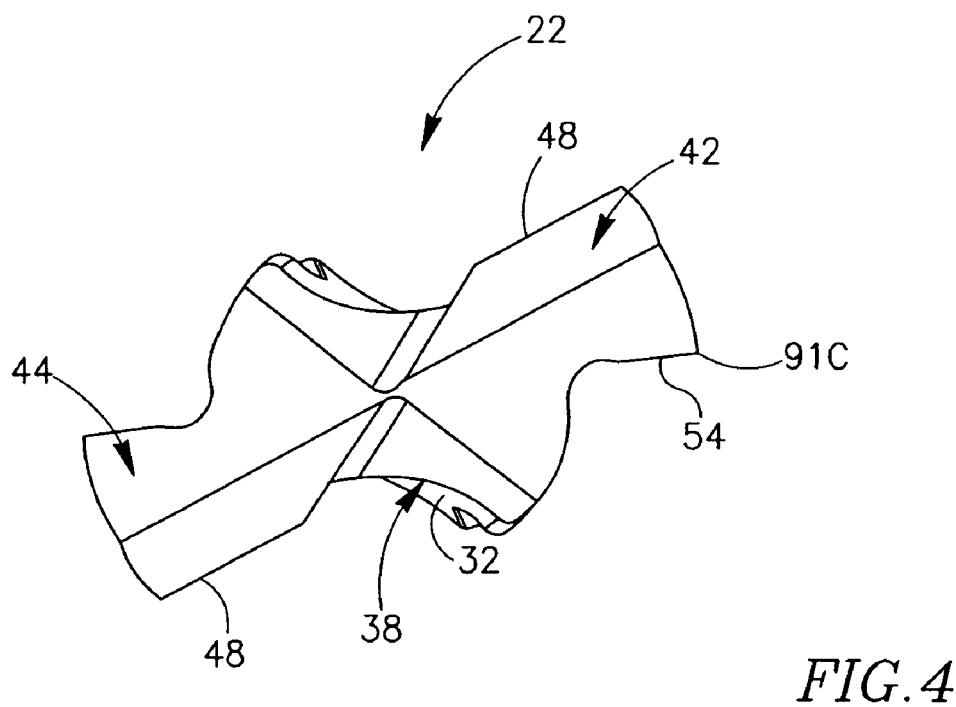
FIG. 4 is a top view of the cutting head shown in FIG. 3.
Figure 5:
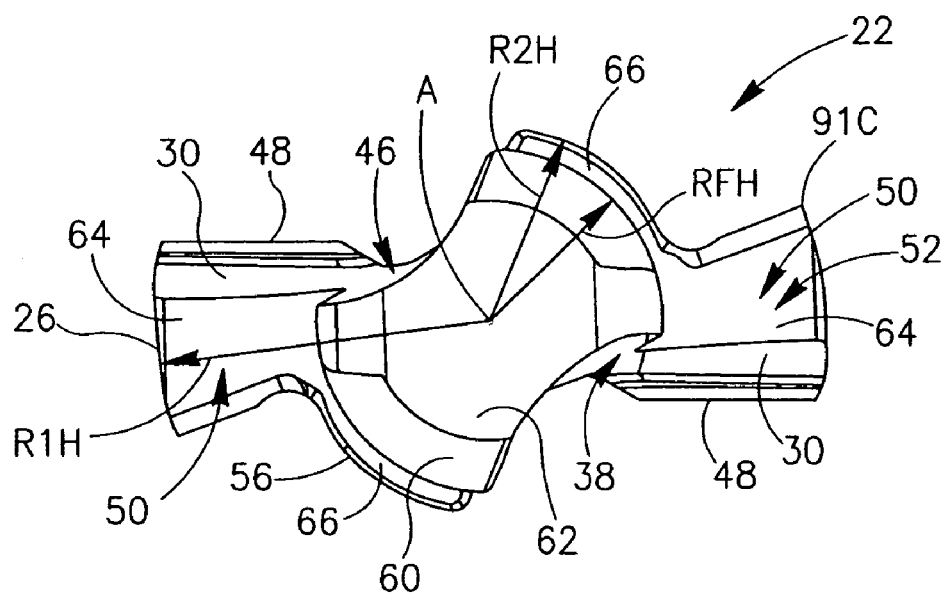
FIG. 5 is a bottom view of the cutting head shown in FIG. 3.

Attention is now drawn to FIGS. 3 to 5. The cutting head 22 is typically made of a solid, hard metal, such as cemented metal carbide (e.g. tungsten carbide) and is generally manufactured by form-pressing and sintering the cemented carbide. The cutting head 22 comprises a cutting portion 42 adjacent a cutting head front face 44 and a mounting portion 46 integrally formed with the cutting portion 42 and extending rearwardly therefrom. The cutting portion 42 comprises cutting edges 48 formed at an intersection of the cutting head front face 44 and each cutting head leading flute section 30. The cutting portion 42 may have any appropriate design and will not be further described herein since it does not constitute the subject matter of the present invention.

The mounting portion 46 comprises a pair of identical cutting head coupling portions 50. Each cutting head coupling portion 50 is bounded by the cutting head cylindrical outer surface 28, and by adjacent cutting head leading and trailing flute sections 30, 32, and comprises a planar cutting head base surface 52 which is perpendicular to the axis of rotation A, and a cutting head torque transmission wall 54 which extends forwardly from the cutting head base surface 52 to the cutting head front face 44, and generally radially inwardly from the cutting head cylindrical outer surface 28 to a cutting head cylindrical inner wall 56. The cutting head cylindrical inner wall 56 extends from the cutting head base surface 52 to the cutting head front face 44 parallel to the axis of rotation A, and circumferentially from the cutting head torque transmission wall 54 to the adjacent cutting head trailing flute section 36.

Each cutting head coupling portion 50 additionally comprises a cutting head fixation wall 58 extending circumferentially with respect to the axis of rotation A between cutting head leading and trailing flute sections 30, 32. The cutting head fixation walls 58 have conical, dovetail-shaped surfaces which extend away from the cutting head base surface 52 in a direction diverging from the axis of rotation A and coaxially therewith to a cutting head curved rear surface 60. The cutting head curved rear surface 60 extends rearwardly from the cutting head fixation walls 58 while curving radially inwardly to merge with a common cutting head rear face 62 joining the two cutting head coupling portions 50 and extending perpendicularly to the axis of rotation A.

Each cutting head base surface 52 comprises a cutting head first base portion 64 and a cutting head second base portion 66, which are continuous, flat and co-planar. The cutting head first base portion 64 extends generally radially outwardly from the cutting head fixation wall 58 to the cutting head cylindrical outer surface 26, and between the cutting head torque transmission wall 54 and the adjacent cutting head leading flute section 30. The cutting head second base portion 66 extends continuously with and circumferentially away from the cutting head first base portion 64 to the adjacent cutting head trailing flute section 32, and outwardly from the cutting head fixation wall 58 to the cutting head cylindrical inner wall 56. A maximal radial extension of the cutting head first base portion R1H is greater than a maximal radial extension of the cutting head second base portion R2H, which, in turn, is greater than, or equal to, a maximal radial extension of the cutting head fixation wall RFH.

Figure 6:
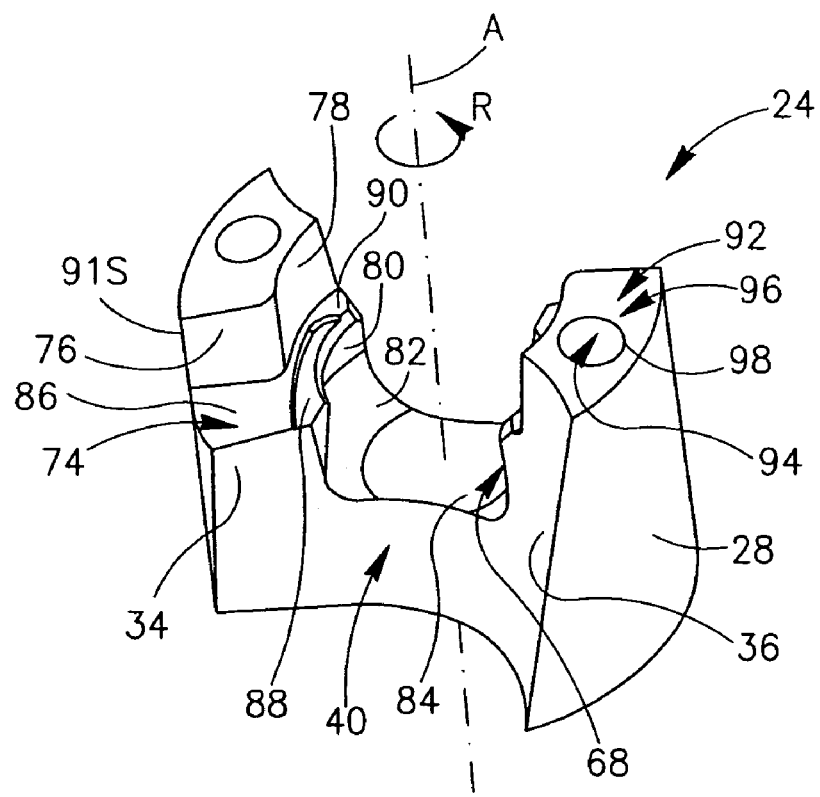
FIG. 6 is a partial perspective view of a shank of the drill shown in FIG. 1.
Figure 7:
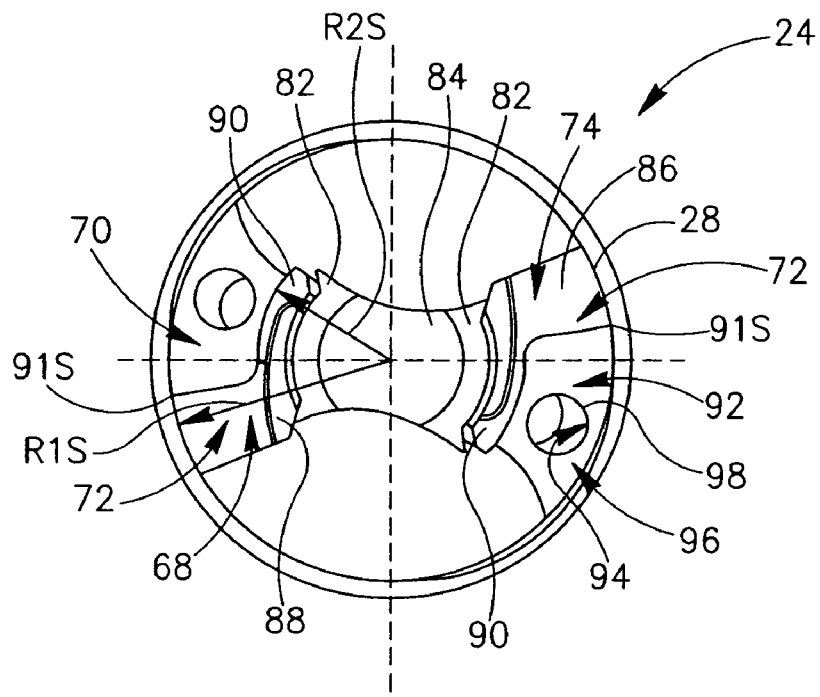
FIG. 7 is a top view of the shank shown in FIG. 6.

Attention is now drawn to FIGS. 6 and 7. The shank 24 comprises a receiving portion 68 extending rearwardly from a shank front face 70. The receiving portion 68 comprises shank coupling portions 72 mating in number, shape and dimensions to the cutting head coupling portions 50. Each shank coupling portion 72 is bounded by the shank cylindrical outer surface 28, and by adjacent shank leading and trailing flute sections 34, 36, and comprises a planar shank base surface 74 perpendicular to the axis of rotation A. The shank coupling portion 72 further comprises a shank torque transmission wall 76 extending forwardly from the shank base surface 74 to the shank front face 70, and generally radially inwardly from the shank cylindrical outer surface 28 to a shank cylindrical inner wall 78. The shank cylindrical inner wall 78 extends forwardly from the shank base surface 74 parallel to the axis of rotation A to the shank front face 70, and circumferentially from the shank torque transmission wall 76 to the adjacent shank trailing flute section 36.

Each shank coupling portion 72 additionally comprises a shank fixation wall 80, which extends circumferentially with respect to the axis of rotation A between the adjacent shank leading and trailing flute sections 34, 36. The shank fixation walls 80 have conical, dovetail-shaped surfaces which extend away from the shank base surface 74 in a direction diverging from the axis of rotation A and coaxially therewith, to merge with a shank curved rear surface 82 extending rearwardly from the shank fixation walls 80 while curving radially inwardly to merge with a common shank rear face 84 joining the two shank coupling portions 72 and extending perpendicularly to the axis of rotation A.

The shank base surface 74 comprises a shank first base portion 86 which extends radially inwardly from the shank cylindrical outer surface 28 to an arcuate shank relief channel 88 adjacent the shank fixation wall 80, whilst extending circumferentially from the shank torque transmission wall 76 to the adjacent shank leading flute section 34. The shank relief channel 88 extends radially inwardly from the shank first base portion 86 to the shank fixation wall 80, and circumferentially from the adjacent shank leading flute section 34 towards the adjacent shank trailing flute section 36, along the shank fixation wall 80. The shank second base portion 90 extends circumferentially from the shank relief channel 88 to the adjacent shank trailing flute section 36, and radially between the shank cylindrical inner wall 78 and the shank fixation wall 80. The shank first and second base portions 86, 90 are flat and co-planar. A maximal radial extension of the shank first base portion R1S (see FIG. 8) is greater than a maximal radial extension of the shank second base portion R2S (see FIG. 7), which, in turn, is greater than or equal to a maximal radial extension of the shank fixation wall RFS (see FIG. 8). The maximal radial extension of the shank second base portion R2S is greater than the maximal radial extension of the cutting head second base portion R2H, as is best shown in FIG. 7.

Each shank coupling portion 72 comprises a shank protrusion 92 extending axially forwardly from the shank base surface 74 and having a shank fluid duct 94 formed therein. The shank protrusion 92 is bounded by the shank cylindrical outer surface 28, by the adjacent shank trailing flute section 36, by the shank torque transmission wall 76, by the shank cylindrical inner wall 78 and by a forwardly facing shank protrusion top face 96. Together, the two shank protrusion top faces 96 form the shank front face 70. The fluid duct 94 terminates in a generally forwardly directed fluid discharge outlet 98 at least partially formed in the shank protrusion top face 96.

Generally, the shank first and second base portions 86, 90, the shank torque transmission walls 76 and the shank fixation walls 80, correspond in orientation to the respective cutting head first and second base portions 64, 66, the cutting head torque transmission walls 54 and cutting head fixation walls 58. The cutting head and shank fixation walls 58, 80 are designed to have an interference fit therebetween when the cutting head 22 is secured to the shank 24.

The drill may be adjusted from an initial position in which the cutting head 22 and the shank 24 are completely separated, to a "detached position" in which they are brought into close proximity with one another. The drill 20 is assembled by positioning the cutting head 22 in front of the shank 24, and urging the cutting head 22 axially towards the shank 24, until the mounting portion 46 is located in the receiving portion 68. This is done by inserting the cutting head coupling portions 50 between the shank coupling portions 72, so that each cutting head leading flute section 30 faces the shank trailing flute section 36, and the cutting head rear face 62 abuts the shank rear face 84. The position so obtained will be referred to as a "detached position", since in this position, the cutting head is not secured to the shank.

Figure 8:
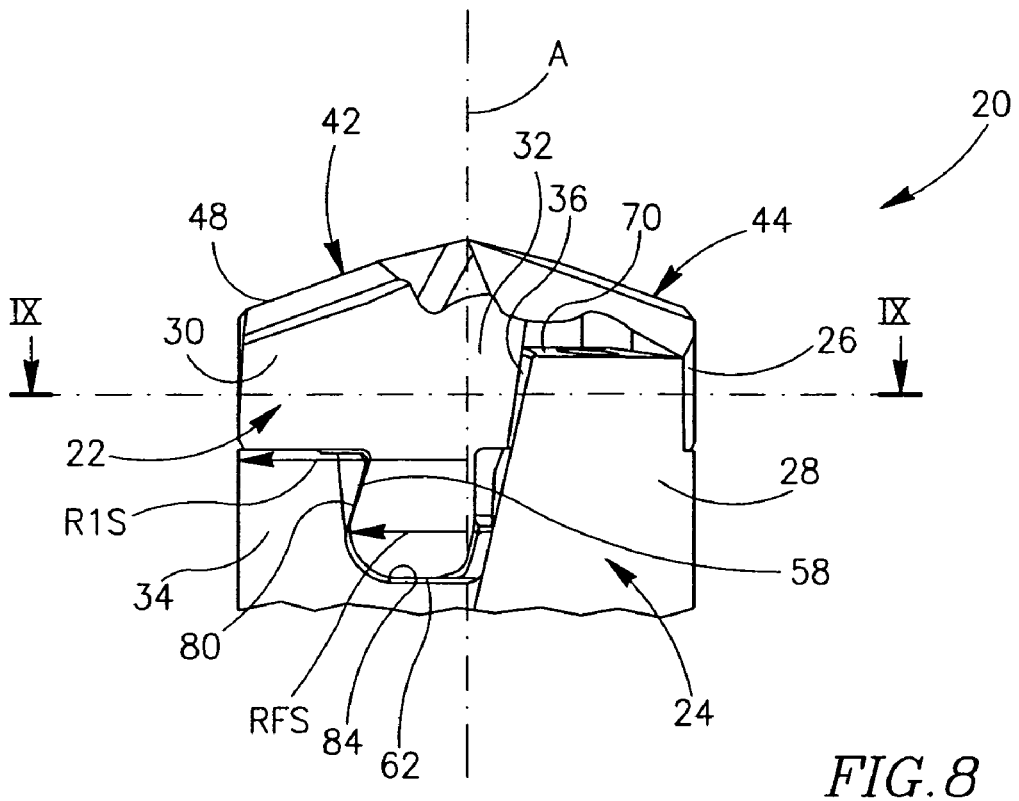
FIG. 8 is a side view of the drill shown in FIG. 1.

The cutting head 22 is transferred from the detached position to a secured position by rotating the cutting head 22 in a direction opposite to the direction of rotation R of the drill 20, until corresponding cutting head and shank torque transmission walls 54, 76 abut, and corresponding cutting head and shank fixation walls 58, 80 are mutually engaged, as is best shown in FIG. 8. In the secured position, in which the cutting head 22 is securely retained by the shank 24, each cutting head first base portion 64 is supported by the corresponding shank first base portion 86, and each cutting head second base portion 66 is supported by the corresponding shank second base portion 90. During assembly of the drill 20, the relief channel 88 prevents premature engagement of the cutting head second base portion 66 with the shank first base portion 86, by allowing the cutting head second base portion 66 to move freely, without contact, along the shank relief channel 88, so that the cutting head and shank first base portions 64, 86 contact first, before contact between the cutting head and shank second base portion 66, 90 is made, and also contact between the shank first base portion 86 and the cutting head second base portion 66 is prevented, thereby facilitating easy and positive engagement of the cutting head 22 and the shank 24.

Figure 9:
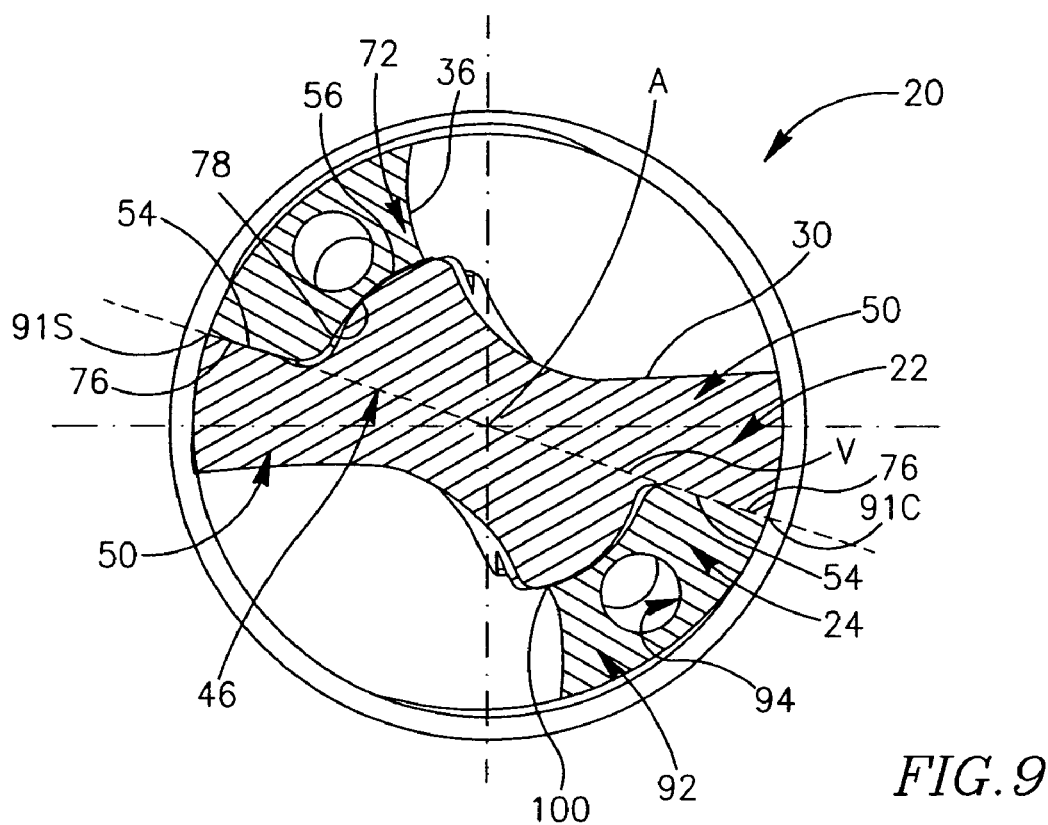
FIG. 9 is a cross-sectional view of the drill shown in FIG. 1, taken along the line IX-IX in FIG. 8.
Figure 10:
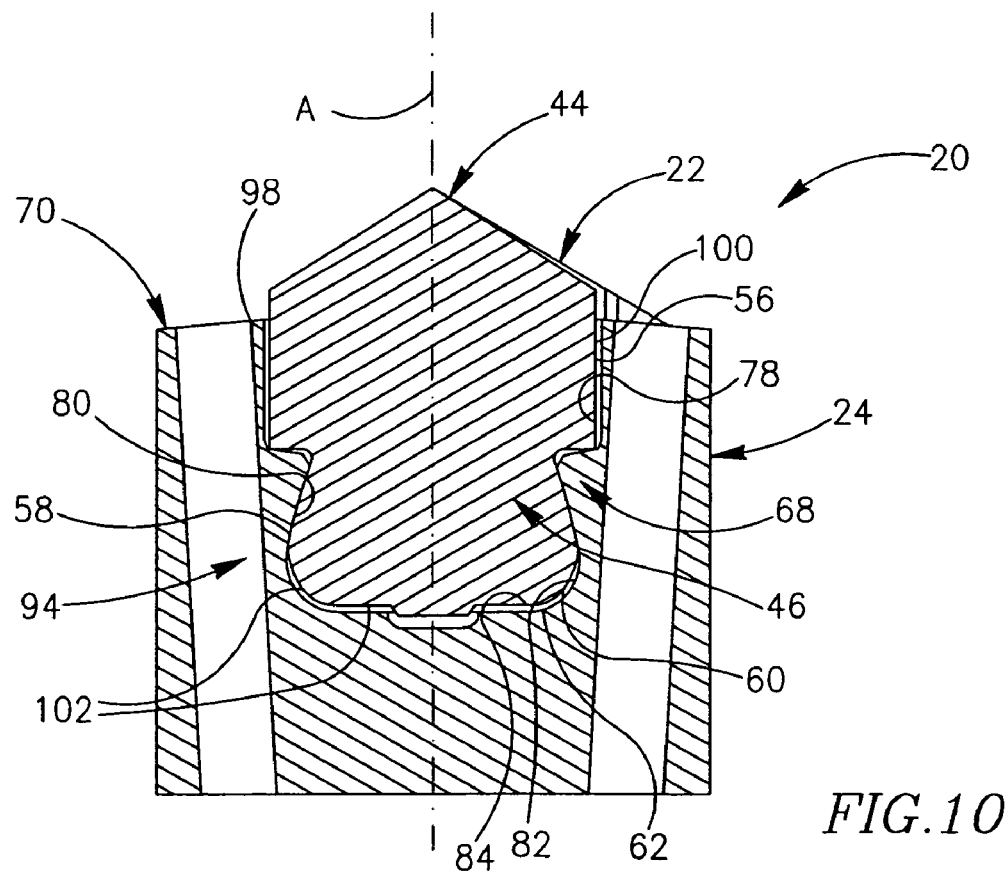
FIG. 10 is a cross-sectional view of the drill shown in FIG. 1, taken along the line X-X in FIG. 2.

When securing the cutting head 22 to the shank 24, the abutment of the cutting head and shank first base portions 64, 86 forces the cutting-head 22 axially forwardly, so that the cutting head and shank fixation walls 58, 80 mutually engage, to provide positive self-clamping and self-centering of the cutting head 22 to the shank 24. Additionally, the interlocking male-female engagement of the cutting head and shank fixation walls 58, 80 prevents the cutting head 22 from being detached from the shank 24 when the drill 20 is withdrawn from a work-piece being machined (not shown). In the secured position, a first gap 100 exists between opposite cutting head and shank cylindrical inner walls 56, 78 (see FIGS. 9 and 10). The fixation walls 58, 80 mutual engagement creates a second gap 102 between the corresponding cutting head and shank curved rear surfaces 60, 82 and rear faces 62, 84 The first and second gaps 100, 102 prevent unnecessary friction during assembly or disassembly of the cutting head 22 and the shank 24. Thus, from the foregoing description, it can be seen that the cutting head and shank can be brought from a first, initial position in which the two are completely separated, to a second, detached position in which the cutting head is not secured to the shank, and from the detached position to a third, secured position.

Figure 2:
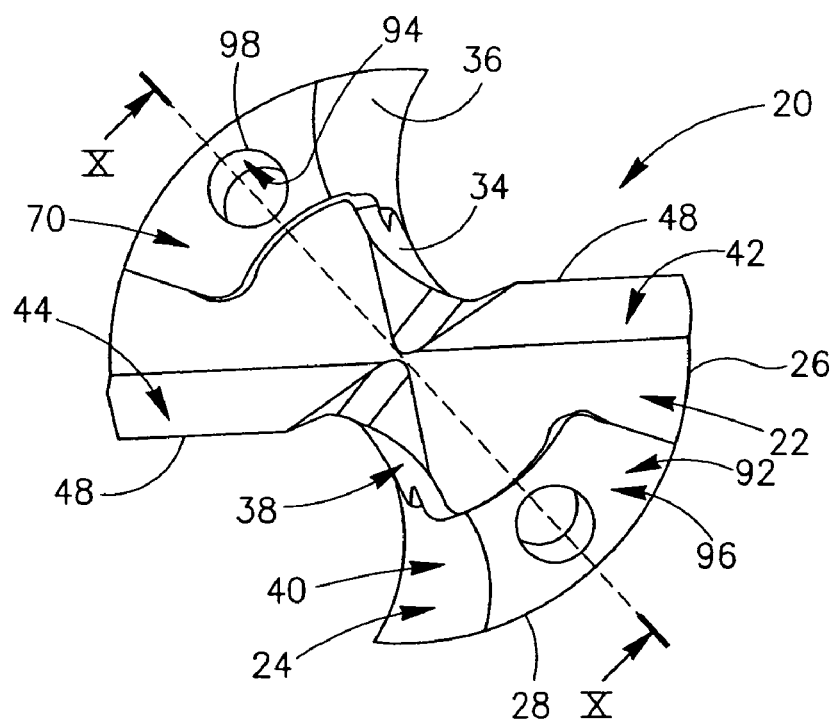
FIG. 2 is a top view of the drill shown in FIG. 1.

As shown in FIGS. 1, 2, and 8, the shank protrusion top faces 96 are forwardly exposed and adjacent the cutting head front face 44, facilitating efficient cutting fluid delivery to the cutting edges 48 and to a bottom of a bore being drilled (not shown).

During a cutting operation, axial forces acting on the cutting edges 48 are supported by the abutment of the cutting head and shank base surfaces 52, 74. A broad axial support for the cutting head 22 is provided by the abutment of the corresponding shank and cutting head first base portions 64, 86, which extends to the cutting head and shank cylindrical outer surfaces 26, 28. The axial support is increased by abutment of the corresponding cutting head and shank second base portions 66, 90. Because the cutting head and shank first base portions 64, 86 are angularly displaced with respect to the cutting head and shank second base portions 66, 90, the additional axial support offered by the abutment of the cutting head and shank second base portions 66, 90 assists in stabilizing the cutting head 22 in the shank 24, and in substantially preventing tilting of the cutting head 22 relative to the shank 24.

Tangential components of the cutting forces are opposed by the shank torque transmission walls 76. In order to efficiently support the cutting forces tangential components, the torque transmission walls 76 are radially directed, so that reaction forces created thereby will have as small as possible radial components. Additionally, the cutting head and shank torque transmission walls 54, 76 are perpendicular to the cutting head and shank base surfaces 52, 74, respectively, to minimize axial components of the reaction forces created thereby.

Figure 11:
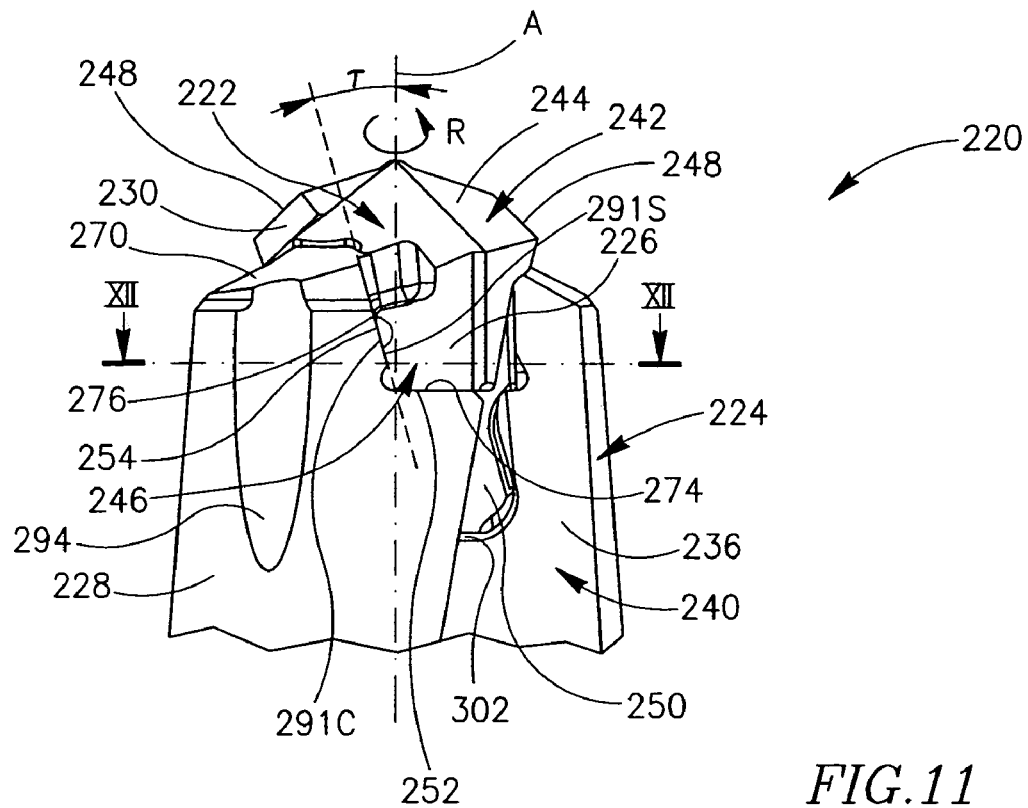
FIG. 11 is a side view of a drill in accordance with a second embodiment of the present invention.
Figure 12:
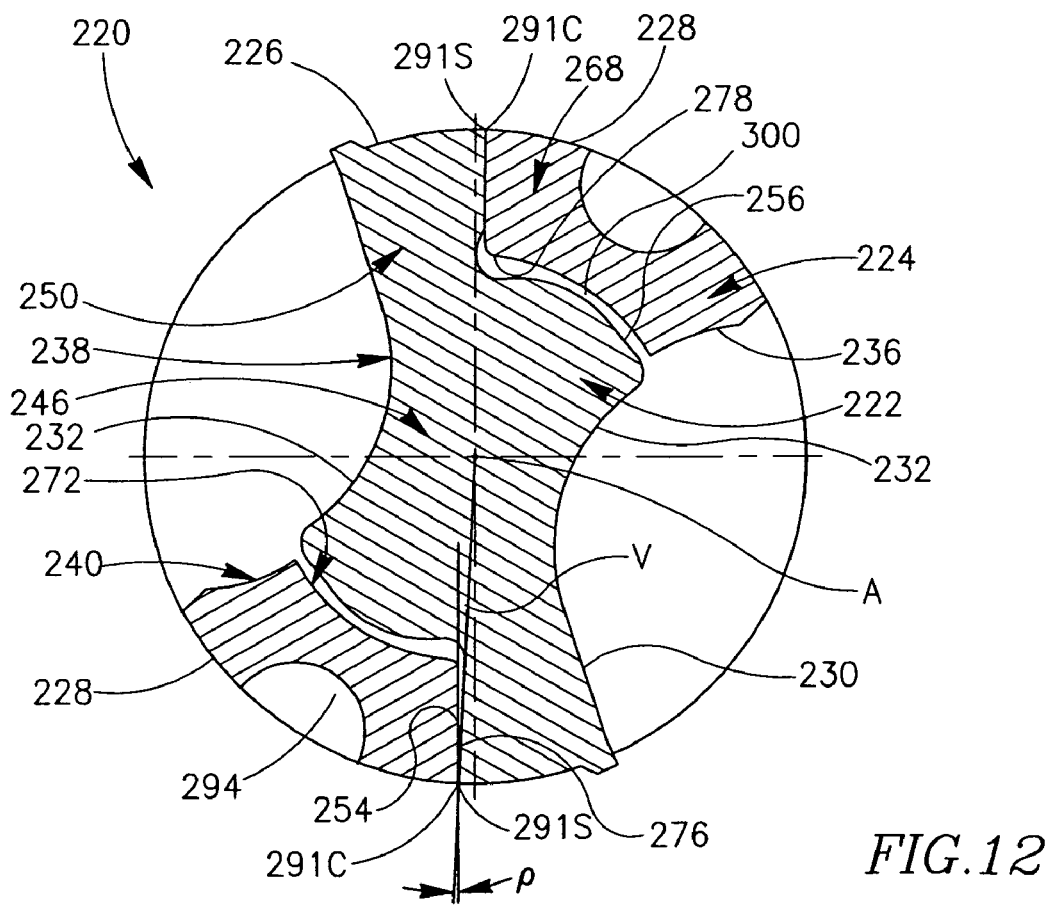
FIG. 12 is a cross-sectional view of the drill shown in FIG. 11, taken along the line XII-XII in FIG. 11.

However, different embodiments may comprise different construction of the torque transmission walls. A drill 220 in accordance with a second embodiment of the present invention is shown in FIGS. 11 and 12. Since the drill 220 has many features which are similar to those of the drill 20 in accordance with the first embodiment, similar features will simply be referred to herein below, by reference numerals which are shifted by 200 from those of the drill 20. The drill 220 comprises a cutting head 222 secured to a shank 224. The cutting head 224 comprises a cutting portion 242 adjacent a cutting head front face 244, and a mounting portion 246 extending rearwardly therefrom.

The cutting portion includes cutting head trailing and leading flute portions 230, 232 of cutting-head flutes 238 and cutting edges 248, much as discussed above. The mounting portion 246 comprises a pair of identical cutting head coupling portions 250. The cutting head coupling portion 250 comprises a planar cutting head base surface 252 which is perpendicular to the axis of rotation A, and a cutting head torque transmission wall 254 extending forwardly from the cutting head base surface 252 to the cutting head front face 244, and inwardly from a cutting head cylindrical outer surface 226 to a cutting head cylindrical inner wall 256. The cutting head cylindrical inner wall 256 extends from the cutting head base surface 252 to the cutting head front face 244 parallel to the axis of rotation A, and circumferentially from the cutting head torque transmission wall 254 to the adjacent cutting head trailing flute section 232.

The shank comprises a receiving portion 268 extending rearwardly from a shank front face 270. The shank receiving portion 268 comprises shank coupling portions 272 mating in number, shape and dimensions to the cutting head coupling portions 250. Each shank coupling portion 272 comprises a planar shank base surface 274 which is perpendicular to the axis of rotation A, and a shank torque transmission wall 276 extending forwardly from the shank base surface 274 to the shank front face 270, and inwardly from the shank cylindrical outer surface 228 to a shank cylindrical inner wall 278. The shank cylindrical inner wall 278 extends from the shank base surface 274 to the shank front face 270 parallel to the axis of rotation A, and circumferentially from the shank torque transmission wall 276 to an adjacent shank trailing flute section 236 of a shank flute 240.

As is best shown in FIG. 11, the cutting head and shank torque transmission walls 254, 276 extend away from the cutting head and shank base surfaces 252 in a direction diverging from the axis of rotation A at an acute tilt angle τ of between 0° and 20°. In a particular embodiment, the tilt angle τ is 15°. As best shown in FIG. 12, the cutting head and the shank torque transmission walls 254, 276 form a radial deviation angle ρ with a radius vector V extending from the axis of rotation A to cutting head and shank external edges 291C, 291S formed at an intersection of the cutting head and shank torque transmission walls 254, 276 and the cutting head and shank cylindrical outer surface 226, respectively, as viewed in a cross section perpendicular to the axis of rotation A adjacent the cutting head and shank base surfaces 252. The radial deviation angle ρ may have value of between 0° and 5° on either side of the radius vector V to the external edges 291C, 291S. In the particular embodiment, the radial deviation angle is 1.5°.

Also, as is the case with the first embodiment, a first gap 300 and second gap 302 appear in analogous locations, between the cutting head and the shank.

Although the present invention has been described to a certain degree of particularity, it should be understood that various alterations and modifications may possibly be made without departing from the scope of the invention as hereinafter claimed.

What is claimed is:

1. A rotary cutting tool comprising:
  a cutting head detachably secured to a shank, the cutting head and the shank having mating cylindrical outer surfaces and leading and trailing flute sections, and a common axis of rotation (A) defining a front-to-rear direction and a direction of rotation (R);
  the cutting head comprising a cutting portion adjacent a cutting head front face and a mounting portion extending rearwardly therefrom;
  the shank comprising a receiving portion extending rearwardly from a shank front face;
  the mounting portion and the receiving portion mate in shape and dimensions, each comprising at least two coupling portions bounded by the cylindrical outer surfaces and by the leading and trailing flute sections;
  each coupling portion comprising a planar base surface extending transversely to the axis of rotation (A), a torque transmission wall extending generally inwardly from the cylindrical outer surface to a cylindrical inner wall, and a fixation wall extending rearwardly from the base surface and circumferentially relative to the axis of rotation (A);
  each base surface comprising a first base portion extending generally inwardly from the cylindrical outer surface towards the fixation wall, and from the torque transmission wall to the adjacent leading flute section, and a second base portion co-planar therewith, extending inwardly from the cylindrical inner wall to the fixation wall, and circumferentially from the adjacent trailing flute section towards the first base portion;
  wherein the cutting head coupling portions and the shank coupling portions engage each other, with their fixation walls, their torque transmission walls, their first base portions and their second base portions abutting each other.

2. The rotary cutting tool in accordance with claim 1, wherein a relief channel disposed in each shank base surface separates the shank first and second base portions, each relief channel extending from the shank first base portion to the shank fixation wall, and circumferentially from the adjacent shank flute leading section to the shank second base portion.

3. The rotary cutting tool in accordance with claim 1, wherein a maximal radial extension of the first base portion (R1) is greater than a maximal radial extension of the second base portion (R2).

4. The rotary cutting tool in accordance with claim 3, wherein the maximal radial extension of the second base portion (R2) is greater than or equal to a maximal radial extension of the fixation wall (RF).

5. The rotary cutting tool in accordance with claim 3, wherein the maximal radial extension of the shank second base portion (R2S) is greater than the maximal radial extension of the cutting head second base portion (R2H).

6. The rotary cutting tool in accordance with claim 1, wherein a first gap exists between opposing cutting head and shank cylindrical inner walls.

7. The rotary cutting tool in accordance with claim 1, wherein the cutting head and shank torque transmission walls and the cutting head and shank cylindrical inner walls extend forwardly from the cutting head and shank base surfaces to the cutting head and shank front faces, respectively.

8. The rotary cutting tool in accordance with claim 1, wherein the shank front face is forwardly exposed and adjacent the cutting head front face.

9. The rotary cutting tool in accordance with claim 1, wherein the torque transmission walls extend away from the base surface in a direction diverging from the axis of rotation (A), at an acute tilt angle ($\tau$).

10. The rotary cutting tool in accordance with claim 9, wherein the acute tilt angle ($\tau$) is equal to or less than 20°.

11. The rotary cutting tool in accordance with claim 1, wherein in a cross section perpendicular to the axis of rotation (A) adjacent the base surface, the torque transmission wall of each coupling portion forms a radial deviation angle ($\rho$) with a radius-vector extending from the axis of rotation (A) to an external edge at the intersection of the torque transmission wall and the cylindrical outer surface.

12. The rotary cutting tool in accordance with claim 11, wherein the radial deviation angle ($\rho$) is equal to or less than 5°.

13. The rotary cutting tool in accordance with claim 1, wherein the fixation walls extend coaxially with, and diverge radially from, the axis of rotation (A), in a direction away from the base surfaces.

14. The rotary cutting tool in accordance with claim 1, wherein the fixation walls extend rearwardly from the base surfaces to merge with a curved rear surface.

15. The rotary cutting tool in accordance with claim 14, wherein the curved rear surfaces extend rearwardly while curving radially inwardly to merge with a rear face perpendicular to the axis of rotation (A).

16. The rotary cutting tool in accordance with claim 15, wherein, when the cutting head is secured in the shank, a second gap exists between the cutting head and shank curved rear surfaces and between the cutting head and shank rear faces.

17. A replaceable cutting head having an axis of rotation (A) defining a front-to-rear direction and a direction of rotation (R) and comprising:
a cutting head cutting portion adjacent a cutting head front face and a mounting portion extending rearwardly therefrom, the mounting portion comprising at least two cutting head coupling portions;
each cutting head coupling portion comprising a planar cutting head base surface extending transversely to the axis of rotation (A), a cutting head torque transmission wall extending generally radially inwardly from a cutting head cylindrical outer surface to a cutting head cylindrical inner wall and forwardly from the cutting head base surface, and a cutting head fixation wall extending rearwardly from and circumferentially along the cutting head base surface relative to the axis of rotation (A);

each cutting head base surface comprising a cutting head first base portion extending generally inwardly from the cutting head cylindrical outer surface to the cutting head fixation wall, and from the cutting head torque transmission wall to a cutting head leading flute portion, and a cutting head second base portion co-planar with the cutting head first base portion and extending continuously circumferentially therefrom to a cutting head trailing flute section and inwardly from the cutting head cylindrical inner wall to the cutting head fixation wall.

18. The replaceable cutting head in accordance with claim 17, wherein a maximal radial extension of the cutting head first base portion (R1H) is greater than a maximal radial extension of the cutting head second base portion (R2H).

19. The replaceable cutting head in accordance with claim 18, wherein the maximal radial extension of the cutting head second base portion (R2H is greater than or equal to a maximal radial extension of the cutting head fixation wall (RFH).

20. The replaceable cutting head in accordance with claim 17, wherein the cutting head torque transmission walls and the cutting head cylindrical inner walls extend forwardly from the cutting head base surface to the cutting head front face.

21. The replaceable cutting head in accordance with claim 17, wherein the cutting head torque transmission walls extend away from the cutting head base surface in a direction diverging from the axis of rotation (A), at an acute tilt angle ($\tau$).

22. The replaceable cutting head in accordance with claim 21, wherein the acute tilt angle ($\tau$) is less than or equal to 20°.

23. The replaceable cutting head in accordance with claim 17, wherein each cutting head torque transmission walls forms a radial deviation angle ($\rho$) with a radius-vector extending from the axis of rotation (A) to a cutting head external edge at the intersection of the cutting head torque transmission wall and an adjacent cutting head cylindrical outer surface, at a cross section perpendicular to the axis of rotation (A) adjacent the cutting head base surface.

24. The replaceable cutting head in accordance with claim 23, wherein the radial deviation angle ($\rho$) is equal to or less than 5°.

25. The replaceable cutting head in accordance with claim 17, wherein the cutting head fixation walls have dovetail shaped surfaces extending coaxially with, and diverging radially from, the axis of rotation (A), in a direction away from the cutting head base surfaces.

26. A rotary cutting tool assembly comprising:
a cutting head having:
a first axis of rotation defining a front-to-rear direction and a direction of rotation (R);
a first cylindrical outer surface and first leading and first trailing flute sections;
a cutting portion adjacent a cutting head front face and a mounting portion extending rearwardly therefrom, the mounting portion comprising at least first and second cutting head coupling portions bounded by the first cylindrical outer surface and by the first leading and first trailing flute sections;
the first and second cutting head coupling portions each comprising:
a first planar base surface extending transversely to the first axis of rotation;
a first torque transmission wall extending generally inwardly from the first cylindrical outer surface to a first cylindrical inner wall; and
a first fixation wall extending rearwardly from the first planar base surface and circumferentially relative to the first axis of rotation; wherein the first planar base surface comprises a first base portion extending generally inwardly from the first cylindrical outer surface towards the fixation wall, and from the first torque transmission wall to an adjacent first leading flute section, and a second base portion co-planar therewith, extending inwardly from the first cylindrical inner wall to the first fixation wall, and circumferentially from an adjacent first trailing flute section towards the first base portion; and a shank having:

a second axis of rotation;

a second outer surface and second leading and second trailing flute sections;

a receiving portion extending rearwardly from a shank front face, the receiving portion comprising at least first and second shank coupling portions bounded by the second cylindrical outer surface and by the second leading and second trailing flute sections;

the first and second shank coupling portions each comprising:

a second planar base surface extending transversely to the second axis of rotation;

a second torque transmission wall extending generally inwardly from the second cylindrical outer surface to a second cylindrical inner wall; and a second fixation wall extending rearwardly from the second planar base surface and circumferentially relative to the second axis of rotation; wherein the second planar base surface comprises a first base portion extending generally inwardly from the second cylindrical outer surface towards the fixation wall, and from the second torque transmission wall to an adjacent second leading flute section, and a second base portion co-planar therewith, extending inwardly from the second cylindrical inner wall to the second fixation wall, and circumferentially from an adjacent second trailing flute section towards the second base portion;

wherein:

the assembly is adjustable from an initial position in which the cutting head and shank are separated, to a secured position in which the cutting head coupling portions and the shank coupling portions engage each other with their fixation walls, their torque transmission walls, their first base portions and their second base portions abutting each other.

\* \* \* \* \*